United States Patent [19]

Niwa et al.

[11] 4,436,906

[45] Mar. 13, 1984

[54] ANTHRAQUINONE DYES FOR CELLULOSE-CONTAINING FIBERS AND PROCESS FOR PRODUCING THE SAME

[75] Inventors: Toshio Niwa; Toshio Hihara, both of Kanagawa, Japan

[73] Assignee: Mitsubishi Chemical Industries Ltd., Tokyo, Japan

[21] Appl. No.: 380,320

[22] Filed: May 20, 1982

[30] Foreign Application Priority Data

| | | | |
|---|---|---|---|
| May 20, 1981 | [JP] | Japan | 56-75974 |
| Jul. 20, 1981 | [JP] | Japan | 56-113258 |
| Jul. 24, 1981 | [JP] | Japan | 56-116015 |
| Jul. 27, 1981 | [JP] | Japan | 56-117472 |

[51] Int. Cl.[3] .......... C07D 251/42

[52] U.S. Cl. .......... 544/187; 544/189

[58] Field of Search .......... 544/187, 189

[56] References Cited

U.S. PATENT DOCUMENTS

| | | | |
|---|---|---|---|
| 3,454,551 | 7/1969 | Mangini et al. | 544/189 |
| 4,120,855 | 10/1978 | Liverant et al. | 544/187 |
| 4,273,553 | 6/1981 | Harms et al. | 544/188 |
| 4,276,047 | 6/1981 | Imahori et al. | 544/188 |

*Primary Examiner*—John M. Ford
*Attorney, Agent, or Firm*—Sughrue, Mion, Zinn, Macpeak & Seas

[57] ABSTRACT

An anthraquinone dye for cellulose-containing fibers having the formula (I) indicated below and a process for producing the same are disclosed:

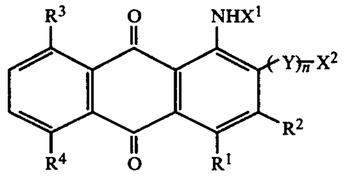

(I)

wherein $R^1$ is an amino group or a hydroxyl group; $R^2$ is a hydrogen atom, a chlorine atom, a bromine atom, a cyano group or $-SO_2R$ (wherein R is a lower alkyl group or a phenyl group); $R^3$ and $R^4$ are each a hydrogen atom, an amino group, a hydroxyl group, a nitro group, a chlorine atom or a bromine atom; Y is a bonding group —O— or —S—; one of $X^1$ and $X^2$ is a hydrogen atom and the other is

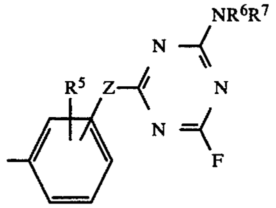

(wherein Z is a bonding group —O— or —S—; $R^5$ is a lower alkyl group, a lower alkoxy group or a hydrogen atom; $R^6$ and $R^7$ are each a hydrogen atom or an alkyl group, an alkenyl group, a cyanohexyl group, an aryl group or an aralkyl group which may be substituted by a cyano group, a hydroxyl group, a lower alkoxy group or a dialkylamino group, or $NR^6R^7$ represents a 5- or 6-membered nitrogen-containing heterocyclic ring formed by the bonding of $R^6$ and $R^7$; the sum of the carbon atoms of $R^6$ and $R^7$ is not more than 18); and n is 0 or 1, but n is 0 when $X^2$ is a hydrogen atom.

2 Claims, No Drawings

ANTHRAQUINONE DYES FOR CELLULOSE-CONTAINING FIBERS AND PROCESS FOR PRODUCING THE SAME

FIELD OF THE INVENTION

The present invention relates to anthraquinone dyes for cellulose-containing fibers and a process for producing the same. The dyes of the present invention are reactive anthraquinone dyes capable of providing a fast bluish red to blue color for cellulose-containing fibers, especially cellulose fibers and mixed fibers made of polyester fibers and cellulose fibers.

SUMMARY OF THE INVENTION

The anthraquinone dyes for cellulose-containing fibers according to the present invention are represented by the following formula (I):

(I)

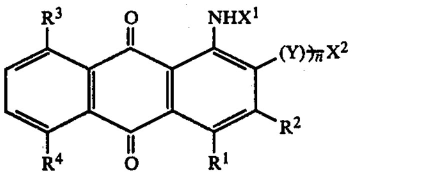

wherein $R^1$ is an amino group or a hydroxyl group; $R^2$ is a hydrogen atom, a chlorine atom, a bromine atom, a cyano group or —$SO_2R$ (wherein R is a lower alkyl group or a phenyl group); $R^3$ and $R^4$ are each a hydrogen atom, an amino group, a hydroxyl group, a nitro group, a chlorine atom or a bromine atom; Y is a bonding group —O— or —S—; one of $X^1$ and $X^2$ is a hydrogen atom and the other is

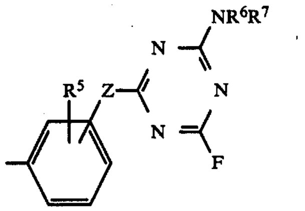

(wherein Z is a bonding group —O— or —S—; $R^5$ is a lower alkyl group, a lower alkoxy group or a hydrogen atom; $R^6$ and $R^7$ are each a hydrogen atom or an alkyl group, an alkenyl group, a cyclohexyl group, an aryl group or an aralkyl group which may be substituted by a cyano group, a hydroxyl group, a lower alkoxy group or a dialkylamino group, or $NR^6R^7$ represents a 5- or 6-membered nitrogen-containing heterocyclic ring formed by the bonding of $R^6$ and $R^7$; the sum of the carbon atoms of $R^6$ and $R^7$ is not more than 18); and n is 0 or 1, but n is 0 when $X^2$ is a hydrogen atom.

DETAILED DESCRIPTION OF THE INVENTION

Examples of the lower alkyl group represented by R and $R^5$ in the formula (I) include methyl, ethyl, n-propyl and isopropyl groups, and examples of the lower alkoxy group represented by $R^5$ include methoxy, ethoxy, n-propoxy and isopropoxy groups.

Examples of the alkyl group represented by $R^6$ and $R^7$ in the formula (I) include a methyl group, an ethyl group and straight or branched alkyl groups having 3 to 18 carbon atoms, and examples of the substituted alkyl group include alkyl groups substituted by a cyano, hydroxyl, lower alkoxy or dialkylamino group, such as cyanomethyl, 2-cyanoethyl, 3-cyanopropyl, 2-hydroxyethyl, 2-hydroxypropyl, 3-hydroxypropyl, 4-hydroxybutyl, 2-(2-hydroxyethoxy)ethyl, tris(hydroxymethyl)methyl group, 2-ethoxyethyl, 3-isopropoxypropyl, 3-(2-methoxyethoxy)propyl, 2,2-diethoxyethyl, 2-(N,N-diethylamino)ethyl, 2-(N,N-dimethylamino)ethyl and 3-(N,N-dimethylamino)propyl groups.

Examples of the alkenyl group include an allyl group, a 2-methylallyl group, a 3-methylallyl group and straight or branched alkenyl groups having 4 to 18 carbon atoms, and examples of the substituted alkenyl group include alkenyl groups substituted by a cyano, hydroxyl or lower alkoxy group, such as 3-cyanoallyl, 2-hydroxyallyl, 3-methoxyethoxyallyl and 1-methyl-3-(N,N-diethylamino)allyl groups.

Examples of the aryl group include phenyl, naphthyl, o-tolyl and p-butylphenyl groups, and examples of the aryl group substituted by a cyano, hydroxyl, lower alkoxy or dialkylamino group include m-cyanophenyl, p-hydroxyphenyl, p-methoxyphenyl, p-(2-methoxyethoxy)phenyl, 2,5-dimethoxyphenyl and p-(N,N-dimethylamino)phenyl groups.

Examples of the aralkyl group include benzyl, phenethyl, m-methylbenzyl and p-methylphenethyl groups, and examples of the substituted aralkyl group include m-cyanobenzyl, p-hydroxybenzyl, p-hydroxyphenethyl and o-anisyl groups.

Examples of the nitrogen-containing heterocyclic ring represented by $NR^6R^7$ include 1-pyrrolidinyl, 3-methyl-1-pyrrolidinyl, 2-hydroxyethyl-1-pyrrolidinyl, 2,5-dimethyl-1-pyrrolidinyl, 3-thiazolidinyl, 1-pyrrolyl, 1-pyrazolyl, 1-imidazolyl, morpholino, piperidino, 2,6-dimethylpiperidino, 1-piperazinyl, and 4-methyl-1-piperazinyl groups. A di-substituted amino group having a total carbon number of 6 to 12 is particularly preferred as $NR^6R^7$.

Preferred examples of $R^2$ in the dye having the formula (I) are a hydrogen atom, a chlorine atom, a bromine atom and a cyano group, and preferred examples of $R^3$ and $R^4$ are a hydrogen atom, an amino group and a hydroxyl group, and a preferred example of Y and Z is a bonding group —O—, and a preferred example of $R^5$ is a hydrogen atom.

The dyes of the formula (I) can be produced with advantage on an industrial scale by reacting anthraquinone compounds of the formula (II):

(II)

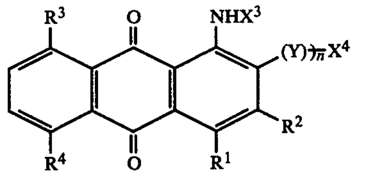

wherein $R^1$, $R^2$, $R^3$, $R^4$, Y and n are each the same as defined above; one of $X^3$ and $X^4$ is a hydrogen atom and the other is

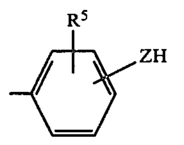

(wherein $R^5$ is the same as defined above, and —ZH is a hydroxyl or mercapto group), and n is 0 when $X^4$ is a hydrogen atom, with difluorotriazines of the formula (III):

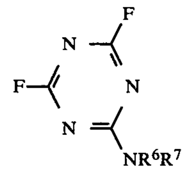

(III)

wherein $R^6$ and $R^7$ are the same as defined above.

The process of producing the anthraquinone dyes of the formula (I) is described more specifically below. Mixtures of the anthraquinone compounds of the formula (II) with 1 to 1.2 mols of the difluorotriazines of the formula (III) on the basis of said anthraquinone compounds are heated at between room temperature and 90° C. for a period of 0.5 to 5 hours in an organic solvent such as acetone, methyl ethyl ketone, toluene, nitrobenzene, dioxane, N,N-dimethylformamide, N-methyl-2-pyrrolidone or dimethyl sulfoxide in the presence of 1 to 2 mols of an acid scavenger, such as a tertiary amine (e.g., triethylamine, tributylamine or N,N-diethylaniline) or an inorganic base (e.g., potassium carbonate or potassium hydrogencarbonate) on the basis of said anthraquinone compounds. The resulting reaction liquor is cooled and discharged into water, and by separating the resulting precipitate through filtration, centrifugation or other suitable means, the anthraquinone dyes of the formula (I) can be produced in a substantially stoichiometric amount.

Examples of the cellulose-containing fibers that can be dyed with the dyes of the formula (I) include natural fibers such as cotton and hemp; semi-synthetic fibers such as viscose rayon and cuprammonium rayon; cellulose fibers modified by partial amination or acylation; and woven, knitted or nonwoven fabrics of these fibers. Other examples are textile blends or mixed fabrics of these fibers with other fibers such as polyester fibers, cation dyeable polyester fibers, anion dyeable polyester fibers, polyamide fibers, wool, acrylic fibers, urethane fibers, diacetate fibers and triacetate fibers. The dyes of the present invention are particularly effective in dyeing cellulose fibers and textile blends or mixed fabrics of cellulose fibers with polyester fibers.

Before dyeing, the dyes of the formula (I) are preferably dispersed in a medium as particles having a size of about 0.5 to 2 microns by one of the following methods: (1) the dyes are reduced to fine particles by a sand grinder, mill or other suitable means and dispersed in water together with a water-soluble dispersant such as a nonionic dispersant (e.g., Pluronic surfactant) or an anionic dispersant (e.g., sodium ligninsulfonate or a sodium salt of naphthalenesulfonic acid-formalin condensate); (2) the fine particles of the dyes are dispersed in a solvent other than water, such as alcohols (e.g., ethyl alcohol, isopropyl alcohol, and polyethylene glycol), ketones (e.g., acetone and methyl ethyl ketone), hydrocarbons (e.g., n-hexane, toluene, xylene and mineral terpene), halogenated hydrocarbons (e.g., tetrachloroethylene), esters (e.g., ethyl acetate and butyl acetate), ethers (e.g., dioxane and tetraethylene glycol dimethyl ether) and mixtures thereof, together with a dispersant sparingly soluble or insoluble in water (e.g., sulfosuccinate ester or an adduct of nonylphenol with a few mols of ethylene oxide); and (3) the fine particles of the dyes are dispersed in a mixture of water and one or more of the solvents listed above that are miscible with water in any proportion. In either method, polymeric compounds that are soluble in the dispersants or surfactants whose major function is other than that of dispersants may be used.

The dispersion of the fine particles of dyes can be immediately used as a padding bath for pad-dyeing or color paste for printing, but usually, the padding bath or color paste is prepared by diluting the dispersion with water, a mixture of water and a solvent that is miscible with water in any proportion or an O/W or W/O type emulsion wherein the oil layer is made of a petroleum hydrocarbon (e.g., mineral terpene) or a hydrocarbon halide (e.g., tetrachloroethylene) to give a desired dye concentration.

To achieve effective dyeing, the padding bath or color paste may contain an agent to swell cellulose fibers or an acid scavenger (e.g., alkali metal compounds, organic epoxy compounds and organic vinyl compounds) that accelerates the reaction between the dyes and cellulose fibers. Illustrative alkali metal compounds include alkali metal carbonates, as well as alkali metal bicarbonates, alkali metal phosphates, alkali metal borates, alkali metal silicates, alkali metal hydroxides, alkali metal salts of aliphatic acids (e.g., alkali metal acetates) and alkali precursor compounds that generate alkalis when they are heated in the presence of water (e.g., sodium trichloroacetate and sodium acetoacetate). The alkali metal compounds are usually added in such an amount that the padding bath or color paste has a pH between 7.5 and 8.5. Illustrative organic epoxy compounds include ethylene glycol diglycidyl ether and polyethylene glycol diglycidyl ether having an average molecular weight of from 150 to 400, and illustrative organic vinyl compounds include ethylene glycol diacrylate, as well as diacrylate or dimethacrylate of polyethylene glycol having an average molecular weight of from 150 to 400. The organic epoxy and vinyl compounds are used in an amount of 3 to 6% by weight of the padding bath or color paste.

To prevent dry migration during pad-dyeing or achieve an optimum paste viscosity for a specific printing method, a binder such as a water-soluble polymer of, say, sodium alginate may be used.

Other methods may be employed to prepare the padding bath or color paste. The cellulose fiber swelling agent and acid scavenger need not be present in the padding bath or color paste, and instead, they may be incorporated in the fibers to be dyed. Any compound that is capable of swelling cellulose fibers and having a boiling point of 150° C. or higher may be used as the acid scavenger, and examples include ureas such as N,N,N',N'-tetramethyl urea, polyols such as polyethylene glycol and polypropylene glycol, and derivatives thereof. Particularly preferred are derivatives of polyols such as polyethylene glycol and polypropylene glycol which do not react with the reactive groups of the dyes and which have an average molecular weight between about 200 and 500 and have their terminal hydroxyl groups dimethylated or diacetylated. The cellulose fiber swelling agent is generally used in an amount of about 5 to 25% by weight, preferably from 8 to 15% by weight, of the padding bath or color paste.

The cellulose-containing fibers listed above can be dyed with the dyes of the formula (I) by any of the conventional methods. For instance, the padding bath or color paste parepared by the methods described above is impregnated in or printed on materials containing cellulose fibers, dried, heated with a blast of hot air (160°-220° C.) or superheated steam for a period of from 30 seconds to 10 minutes, or treated in high-pressure saturated water vapor (120°-150° C.) for a period of 3 to 30 minutes, and washed with heated water containing a surfactant, or with an O/W or W/O type emulsion bath wherein the oil layer is made of a hydrocarbon halide such as tetrachloroethylene, or by ordinary dry cleaning. This method provides a dyed material with a sharp and uniform color which is highly fast to light and moisture.

The present invention is now described in greater detail by reference to the following non-limiting examples wherein all parts are by weight.

EXAMPLE 1

A dye of the formula:

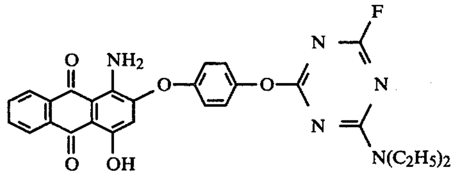

was prepared by the following method.

To a solution of 1-amino-2-(4-hydroxyphenyloxy)-4-hydroxyanthraquinone (3.47 g) in N-methyl-2-pyrrolidone (30 ml), triethylamine (1.1 g) and 2,4-difluoro-6-diethylaminotriazine (1.9 g) were added, and the mixture was stirred at 20° C. for 30 minutes to effect condensation. The resulting reaction liquor was added dropwise to water (500 ml), and the precipitate was filtered, washed with water, and dried in a vacuum dryer at room temperature to form a deep red powder (5.0 g) of the dye of the formula listed above (yield: 97%). The dye had a maximum wavelength (λ max) of 516 nm in acetone. Analysis by thin-layer chromatography showed that the dye had no impurities.

A dye dispersion was made from a mixture of 15 parts of the anthraquinone dye, 15 parts of a naphthalenesulfonic acid-formaldehyde condensate and 70 parts of water by shaking it with a paint shaker. Using the dye dispersion, color paste for printing having the formulation indicated below was prepared.

| | parts |
|---|---|
| Dye dispersion | 6.5 |
| 5% Aqueous solution of sodium alginate | 55.0 |
| Polyethylene glycol dimethyl ether (average molecular weight: 400) | 9.0 |
| Water | 29.5 |
| | 100.0 (pH 6.5) |

A polyester/cotton (65:35) blend cloth was printed with the paste by a screen printing machine, subjected to intermediate drying at 80° C. for 3 minutes, and set by heating at 215° C. for 90 seconds. The cloth was washed with water and soaped with a cleaning solution containing 2 g of a nonionic surfactant (Scorerol #900 of Kao Soap Co., Ltd.) per liter in a liquor ratio of 30:1 at 80° C. for 20 minutes. A bluish red dyed cloth free from staining on white parts and having excellent color fastness to light and wet color fastness was produced.

COMPARATIVE EXAMPLE 1

A dye of the formula:

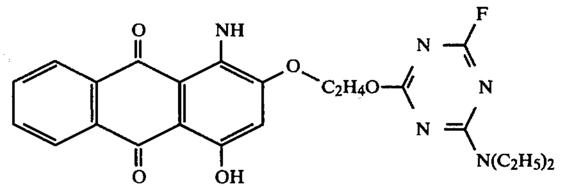

was prepared as in Example 1 except that 1-amino-2-(4-hydroxyphenyloxy)-4-hydroxyanthraquinone was replaced by 2.86 g of 1-amino-2-(2-hydroxyethoxy)-4-hydroxyanthraquinone. The resulting reaction liquor was thin-layer chromatographed on silica gel with a mixed developing solvent of toluene and ethyl acetate (vol. ratio 4:1). Analysis with Chromoscan 200 of Joyce-Loebl Corporation showed that the reaction liquor had yielded less than 5% of the dye of the formula listed above and contained much of the starting materials. So, the same reaction was performed again for an extended period of 20 hours. The dye of the formula indicated above was produced in a yield of about 40%.

EXAMPLE 2

To a solution of 1-amino-2-(3-hydroxyphenyloxy)-4-hydroxyanthraquinone (3.47 g) in dimethyl sulfoxide (30 ml), tributylamine (3.5 g) and 2,4-difluoro-6-(N-methylanilino)triazine (2.4 g) were added, and the mixture was subjected to condensation as in Example 1 to thereby prepare a powder (5.4 g) of the anthraquinone dye of the formula indicated below in a yield of 95%. The dye had a λ max (acetone) of 516 nm.

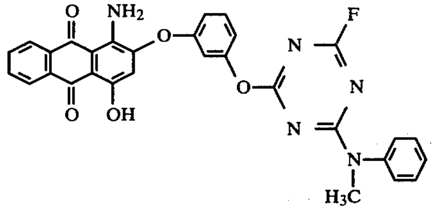

A dye dispersion was made from a mixture of 15 parts of the anthraquinone dye, 10 parts of a Pluronic surfactant (Pluronic®L64 of Asahi Electro-Chemical Co., Ltd.) and 75 parts of water by grinding it with a sand grinder. Using this dye dispersion, color paste for printing having the formulation indicated below was prepared.

| | parts |
|---|---|
| Dye dispersion | 7 |
| 5% Aqueous solution of sodium alginate | 55 |
| Diacetate of polypropylene glycol | 10 |

-continued

| | parts |
|---|---|
| (average molecular weight: 300) | |
| Polyethylene glycol diglycidyl ether | 3 |
| (average molecular weight: 200) | |
| Water | 25 |
| | 100 |
| | (pH 6.5) |

A mercerized cotton broadcloth (count of yarn No. 40) was printed with the paste by a screen printing machine, subjected to intermediate drying at 80° C. for 3 minutes, and set by heating with superheated steam at 185° C. for 7 minutes, followed by washing as in Example 1. A bluish red dyed cloth having high color fastness to light and wet color fastness was produced.

EXAMPLE 3

To a solution of 1-amino-2-(3-hydroxyphenylthio)-4-hydroxyanthraquinone (3.63 g) in acetone (100 ml), triethylamine (1.2 g) and 2,4-difluoro-6-(1-pyrrolidinyl)-triazine (2.0 g) were added, and the mixture was subjected to condensation by heating under reflux for 2 hours. The reaction liquor was treated as in Example 1 to produce 5.0 g of the anthraquinone dye of the formula indicated below in a yield of 91%.

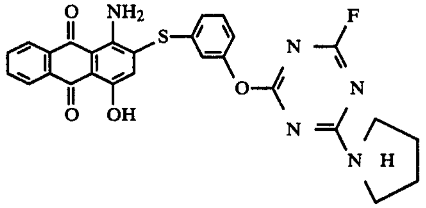

The dye had a λ max (acetone) of 540 nm.

Dye ink was made from a dye composition consisting of the anthraquinone dye (10 parts), polyoxyethylene glycol nonylphenyl ether with an HLB of 8.9 (2 parts) and diethylene glycol diacetate (88 parts) by milling it with a paint conditioner. A mixture of the dye ink (10 parts) and mineral terpene (55 parts) was gradually added to 35 parts of an aqueous solution of the following composition under agitation with a homomixer at 5,000 to 7,000 rpm to prepare color paste in the form of a viscous O/W type emulsion.

| | parts |
|---|---|
| Water | 31 |
| Lepitol G (the trademark for a special nonionic surfactant of Dai-Ichi Kogyo Seiyaku Co., Ltd.) | 3.8 |
| Sodium trichloroacetate | 0.1 |
| | 34.9 |

A polyester/cotton (65:35) blend cloth was printed with the paste by a screen printing machine, dried at 100° C. for 2 minutes and treated with superheated steam at 175° C. for 7 minutes. Subsequently, the cloth was washed with a heated tetrachloroethylene bath containing a small amount of water, and dried to provide a red purple dyed product free from staining on white parts and having high color fastness to light and wet color fastness.

EXAMPLE 4

To a solution of 1-amino-2-(2-hydroxyphenyloxy)-4-hydroxy-5-chloroanthraquinone (3.82 g) in tetrahydrofuran (50 ml), N,N-diethylaniline (1.7 g) and 2,4-difluoro-6-(β-cyanoethyl)aminotriazine (1.85 g) were added and the mixture was subjected to condensation as in Example 3. The reaction liquor was treated as in Example 1 to produce 5.3 g of anthraquinone dye (λ max in acetone = 527 nm) of the following formula in a yield of 93%.

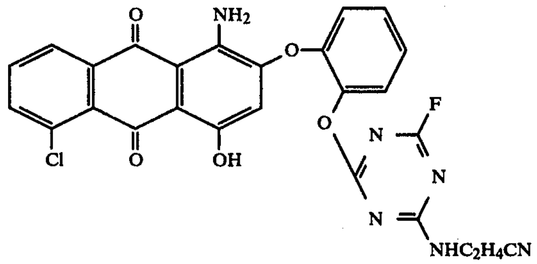

A dye dispersion was made from a mixture of the anthraquinone dye (16 parts), polyoxyethylene glycol nonylphenyl ether with an HLB of 13.3 (7 parts), naphthalene-sulfonic acid-formaldehyde condensate (3 parts) and water (74 parts) by grinding it with a sand grinder. Using the dye dispersion, a padding bath having the following formulation was prepared.

| | parts |
|---|---|
| Dye dispersion | 6 |
| Tetraethylene glycol dimethyl ether | 15 |
| Water | 79 |
| | 100 |
| | (pH 8.0) |

The padding bath was impregnated in a polyester/cotton (65:35) blend cloth, squeezed at a ratio of 45%, dried at 100° C. for 2 minutes and set by heating at 200° C. for 1 minute. By washing the heat set cloth with a heated ethanol bath, a rubine dyed product having high color fastness to light and wet color fastness was produced.

EXAMPLE 5

The anthraquinone dyes listed in Tables 1 to 3 were prepared as in Example 1 and they were used to print pieces of polyester/cotton (65:35) blend cloth as in Example 1. All of the dyed materials were free from staining on white parts and had excellent color fastness to light and wet color fastness. The hue of the dyed materials and the λ max (acetone) data for the dyes are also listed in Tables 1 to 3.

TABLE 1
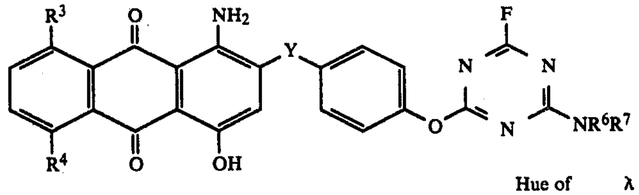
| No. | —R³ | —R⁴ | —Y— | —$NR^6R^7$ | Hue of the Dyed Materials | λ max (acetone) (nm) |
|---|---|---|---|---|---|---|
| 1 | —H | —H | —O— | —$NH_2$ | Bluish red | 516 |
| 2 | " | " | " | —$N(C_2H_4CN)_2$ | " | " |
| 3 | " | " | " | —$NHC_8H_{17}(n)$ | " | " |
| 4 | " | " | " | —$N(CH_2CH_2OCH_3)_2$ | " | " |
| 5 | " | " | " | —$NHCH_2CH_2CH_2OH$ | " | " |
| 6 | " | " | " | —$N(C_4H_9(n))_2$ | " | " |
| 7 | " | " | " | 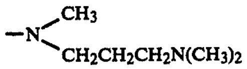 | " | " |
| 8 | " | " | " | 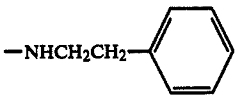 | " | " |
| 9 | " | " | " | 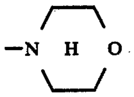 | " | " |
| 10 | " | " | " | 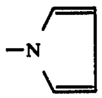 | " | " |
| 11 | " | " | " | 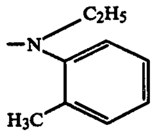 | " | " |
| 12 | " | " | " | 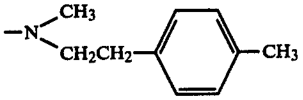 | " | " |
| 13 | " | " | —S— | —$NHC_3H_7(i)$ | Red purple | 540 |
| 14 | " | " | " | —$N(C_2H_5)_2$ | " | " |
| 15 | " | " | " | —$N(C_5H_{11}(n))_2$ | " | " |
| 16 | " | —Br | —O— | —$N(C_4H_9(t))_2$ | Rubine | 527 |
| 17 | " | " | " | 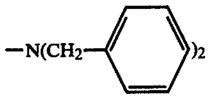 | " | " |
TABLE 2
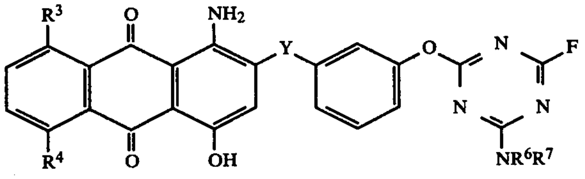
| No. | —R³ | —R⁴ | —Y— | —$NR^6R^7$ | Hue of the Dyed Materials | λ max (acetone) (nm) |
|---|---|---|---|---|---|---|
| 18 | —H | —H | —O— | —$N(C_6H_{13}(n))_2$ | Bluish red | 516 |

TABLE 2-continued
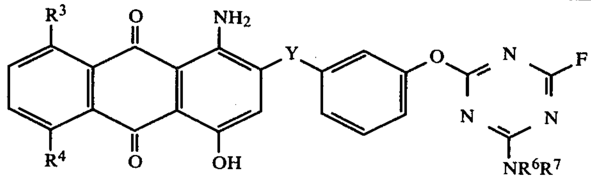
| No. | —R3 | —R4 | —Y— | —NR6R7 | Hue of the Dyed Materials | λ max (acetone) (nm) |
|---|---|---|---|---|---|---|
| 19 | " | " | " | 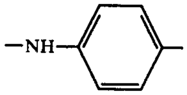 | " | " |
| 20 | " | " | " | 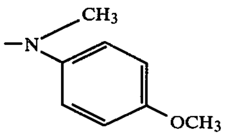 | " | " |
| 21 | " | " | " | $—NHCH_2CH_2CH_2OCH_2CH_2OCH_3$ | " | " |
| 22 | " | " | " | 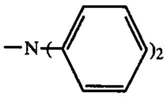 | " | " |
| 23 | " | " | " | 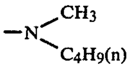 | " | " |
| 24 | " | " | " | 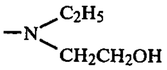 | " | " |
| 25 | " | " | " | 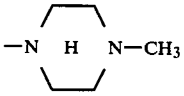 | " | " |
| 26 | " | " | " | $—N[CH_2CH_2CH_2N(CH_3)_2]_2$ | " | " |
| 27 | " | " | " | $—NHC_{14}H_{29}(n)$ | " | " |
| 28 | " | " | " | 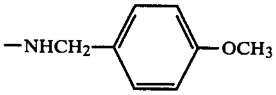 | " | " |
| 29 | " | " | " | 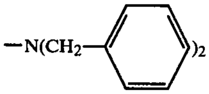 | " | " |
| 30 | " | " | " | 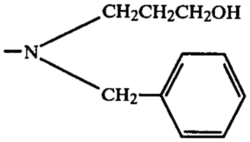 | " | " |
| 31 | " | " | " | 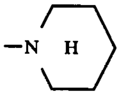 | " | " |
| 32 | " | " | —S— | $—N(C_4H_9(sec))_2$ | Red purple | 540 |

TABLE 2-continued
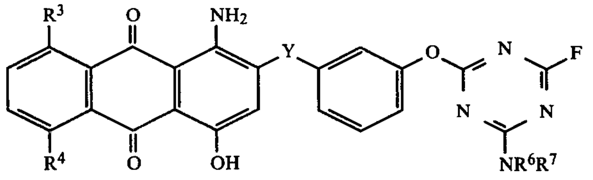
| No. | —$R^3$ | —$R^4$ | —Y— | —$NR^6R^7$ | Hue of the Dyed Materials | λ max (acetone) (nm) |
|---|---|---|---|---|---|---|
| 33 | " | " | " | 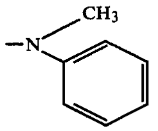 | " | " |
| 34 | " | " | " | 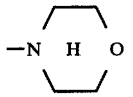 | " | " |
| 35 | " | —Br | " | —$N(CH_3)_2$ | Purple | 548 |
| 36 | " | " | " | 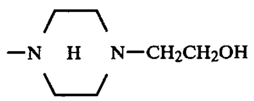 | " | " |
| 37 | —Cl | —H | —O— | —$N(C_6H_{13}(n))_2$ | Rubine | 526 |
| 38 | " | " | " | 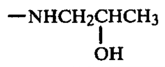 | " | " |
TABLE 3
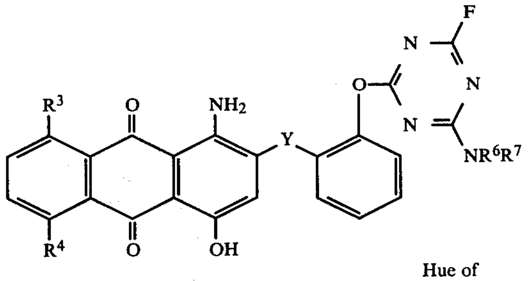
| No. | —$R^3$ | —$R^4$ | —Y— | —$NR^6R^7$ | Hue of the Dyed Materials | λ max (acetone) (nm) |
|---|---|---|---|---|---|---|
| 39 | —H | —H | —O— | 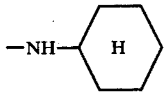 | Bluish red | 516 |
| 40 | " | " | " | —$N(CH_2CH_2OH)_2$ | " | " |
| 41 | " | " | " | —$N(C_3H_7(n))_2$ | " | " |
| 42 | " | " | " | —$N(CH_3)_2$ | " | " |
| 43 | " | " | " | 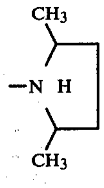 | " | " |
| 44 | " | " | " | —$N(C_7H_{15}(n))_2$ | " | " |

TABLE 3-continued

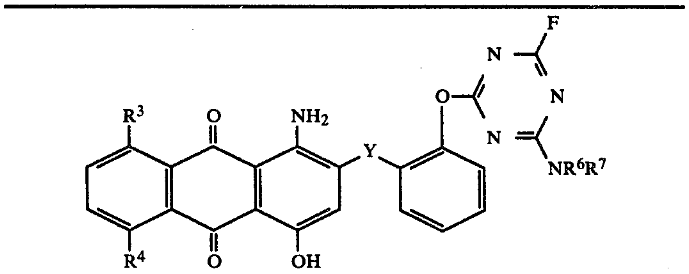

| No. | —$R^3$ | —$R^4$ | —Y— | —$NR^6R^7$ | Hue of the Dyed Materials | λ max (acetone) (nm) |
|---|---|---|---|---|---|---|
| 45 | " | " | " | 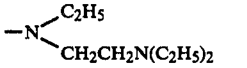 | " | " |
| 46 | " | " | —S— | 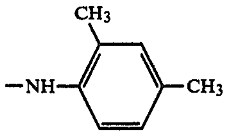 | Red purple | 540 |
| 47 | " | " | " | 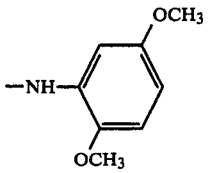 | " | " |
| 48 | " | " | " | $—N(CH_2CH_2OC_2H_5)_2$ | " | " |
| 49 | " | " | " | 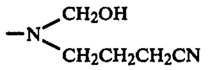 | " | " |

EXAMPLE 6

A dye of the formula:

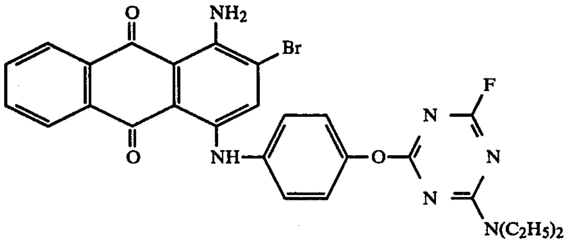

was prepared by the following method.

To a solution of 1-amino-2-bromo-4-(4-hydroxyanilino)anthraquinone (4.09 g) in N-methyl-2-pyrrolidone (120 ml), triethylamine (2.0 g) and 2,4-difluoro-6-diethylaminotriazine (1.9 g) were added, and the mixture was stirred at 25° C. for 1 hour to effect condensation. The resulting reaction liquor was added dropwise to water (1,000 ml), and the precipitate was filtered, washed with water, and dried in a vacuum dryer to form a reddish blue powder (5.5 g) of the dye of the formula indicated above (yield: 95%). The dye and a λ max (acetone) of 610 nm, and analysis by thin-layer chromatography showed that the dye had no impurities.

A dye dispersion was made from a mixture of 15 parts of the anthraquinone dye, 15 parts of a naphthalene-sulfonic acid-formaldehyde condensate and 70 parts of water by shaking it with a paint shaker. Using the dye dispersion, color paste for printing having the formulation indicated below was prepared.

| | parts |
|---|---|
| Dye dispersion | 6.5 |
| 5% Aqueous solution of sodium alginate | 55.0 |
| Polyethylene glycol dimethyl ether (average molecular weight: 400) | 9.0 |
| Water | 29.5 |
| | 100.0 (pH 8.0) |

A polyester/cotton (65:35) blend cloth was printed with the paste by a screen printing machine, subjected to intermediate drying at 80° C. for 3 minutes, and set by heating at 215° C. for 90 seconds. The cloth was washed with water and soaped with a cleaning solution containing 2 g of Scorerol #900 per liter in a liquor ratio of 30:1 at 80° C. for 20 minutes. A blue dyed material free from staining on white parts and having high color fastness to light (grade 4-5) and wet color fastness was produced.

COMPARATIVE EXAMPLE 2

A dye of the formula:

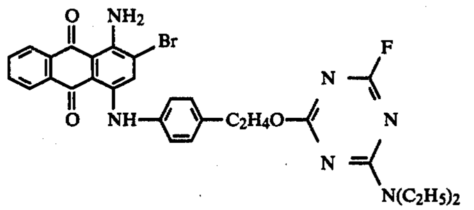

was prepared as in Example 6 except that 1-amino-2-bromo-4-(4-hydroxyanilino)anthraquinone was replaced by 4.37 g of 1-amino-2-bromo-4-(4-hydroxyethylanilino)anthraquinone. The resulting reaction liquor was thin-layer chromatographed on silica gel with a mixed developing solvent of toluene and ethyl acetate (vol. ratio 4:1). Analysis with Chromoscan 200 of Joyce-Loebl Corporation showed that the reaction liquor yielded less than 5% of the desired dye and contained much of the starting material. So, the same reaction was performed again for an extended period of 10 hours. The dye of the formula indicated above was produced in a yield of about 40%.

The dye was separated by chromatography and used to print a polyester/cotton (65:35) cloth as in Example 6. A blue dyed material having a color fastness to light of grade 4 was obtained.

EXAMPLE 7

To acetone (80 ml), 1-amino-2-bromo-4-(3-hydroxyanilino)anthraquinone (4.09 g), 2,4-difluoro-6-di-(n-butyl)aminotriazine (2.5 g), triethylamine (1.1 g) and anhydrous potassium carbonate (1.4 g) were added, and the mixture was heated under reflux for 1 hour. Then, the mixture was cooled to room temperature and methanol (200 ml) was added. The resulting crystal was filtered out to produce a powder (4.8 g) of the anthraquinone dye of the following formula in a yield of 91%.

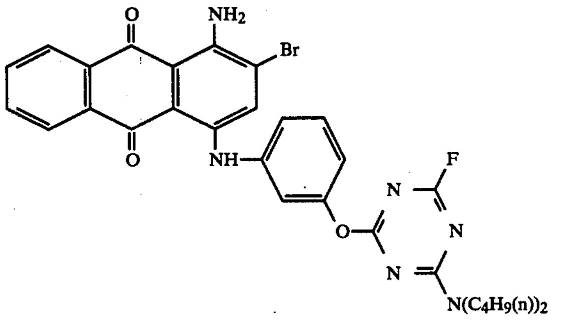

The dye had a λ max (acetone) of 610 nm.

A dye dispersion was made from a mixture of the anthraquinone dye (15 parts), Pluronic ®L64 (10 parts) and water (75 parts) by grinding it with a sand grinder. Using this dye dispersion, color paste for printing having the formulation indicated below was prepared.

| | parts |
|---|---|
| Dye dispersion | 7 |
| 5% Aqueous solution of sodium alginate | 55 |
| Diacetate of polypropylene glycol (average molecular weight: 300) | 10 |
| Polyethylene glycol diglycidyl ether (average molecular weight: 200) | 3 |

-continued

| | parts |
|---|---|
| Water | 25 |
| | 100 (pH 6.5) |

A mercerized cotton broadcloth (count of yarn No. 40) was printed with the paste by a screen printer, subjected to intermediate drying at 80° C. for 3 minutes, and set by heating with superheated steam at 185° C. for 7 minutes, followed by washing as in Example 6. A blue dyed material having high color fastness to light and wet color fastness was produced.

EXAMPLE 8

To dioxane (100 ml), 1-amino-2-cyano-4-(4-hydroxyanilino)anthraquinone (3.55 g), 2,4-difluoro-6-(1-pyrrolidinyl)triazine (1.9 g), triethylamine (1.1 g) and anhydrous potassium carbonate (1.4 g) were added, and the mixture was heated at 80° C. for 1 hour to effect condensation. The reaction liquor was treated as in Example 6 to produce 4.9 g of an anthraquinone dye of the following formula in a yield of 94%.

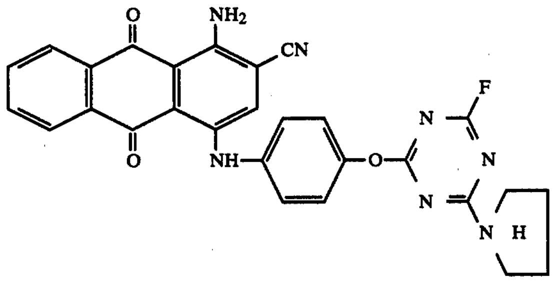

The dye had a λ max (acetone) of 630 nm.

Dye ink was made from a mixture of the anthraquinone dye (10 parts), polyoxyethylene glycol nonylphenyl ether with an HLB of 8.9 (2 parts) and diethylene glycol diacetate (88 parts) by milling it with a paint conditioner. A mixture of 10 parts of the dye ink and 55 parts of mineral terpene was gradually added to 35 parts of an aqueous solution of the following composition under agitation with a homomixer at 5,000 to 7,000 rpm to form color paste in the form of a viscous O/W emulsion.

| | parts |
|---|---|
| Water | 31 |
| Lepitol G | 3.8 |
| Sodium trichloroacetate | 0.1 |
| | 34.9 |

A polyester/cotton (65:35) blend cloth was printed with the paste by a screen printing machine, dried at 100° C. for 2 minutes, and treated with super-heated steam at 75° C. for 7 minutes. Subsequently, the cloth was washed with a heated tetrachloroethylene bath containing a small amount of water, and dried to provide a greenish blue dyed material free from staining on white parts and having high color fastness to light and wet color fastness.

EXAMPLE 9

To tetrahydrofuran (100 ml), 1-amino-2-methylsulfonyl-4-(3-hydroxyanilino)anthraquinone (4.08 g), potassium hydrogencarbonate (2.0 g) and 2,4-difluoro-6-(N-methyl-N-phenylamino)triazine (2.35 g) were added, and the mixture was subjected to condensation by heating under reflux for 1.5 hours. The reaction liquor was treated as in Example 6 to produce 5.8 g of an anthraquinone dye of the following formula in a yield of 95%.

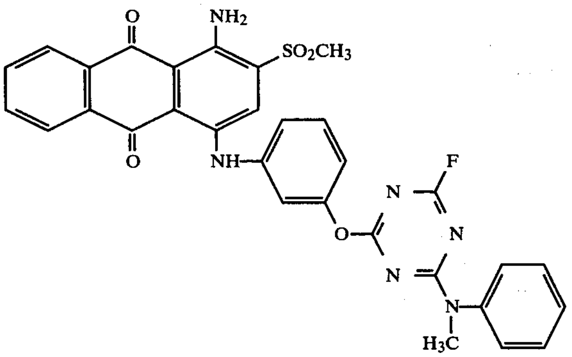

The dye had a λ max (acetone) of 620 nm.

A dye dispersion was made from a mixture of the anthraquinone dye (16 parts), polyoxyethylene glycol nonylphenyl ether with an HLB of 13.3 (7 parts), a naphthalenesulfonic acid-formaldehyde condensate (3 parts) and water (74 parts) by grinding it with a sand grinder. Using this dye dispersion, a padding bath of the formulation indicated below was prepared.

| | parts |
|---|---|
| Dye dispersion | 6 |
| Tetraethylene glycol dimethyl ether | 15 |
| Water | 79 |
| | 100 |
| | (pH 8.0) |

The padding bath was impregnated in a polyester/-cotton (65/35) cloth, squeezed at a ratio of 45%, dried at 100° C. for 2 minutes and set by dry heating at 200° C. for 1 minute. By washing the heat set cloth with a heated ethanol bath, a greenish blue dyed material having high color fastness to light and wet color fastness was produced.

EXAMPLE 10

The anthraquinone dyes listed in Tables 4 to 6 were prepared as in Example 6 and they were used to print pieces of polyester/cotton (65:35) blend cloth as in Example 6. All of the dyed materials had excellent color fastness to light and wet color fastness. The hue of the dyed materials and the λ max (acetone) data for the dyes are also listed in Tables 4 to 6.

TABLE 4

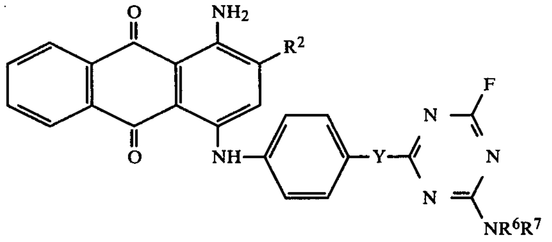

| No. | —$R^2$ | —Y— | —$NR^6R^7$ | Hue of the Dyed Materials | λ max (acetone) (nm) |
|---|---|---|---|---|---|
| 1 | —Cl | —O— | 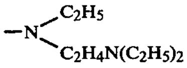 | Blue | 609 |
| 2 | —Br | " | —$N(CH_3)_2$ | " | 610 |
| 3 | " | " | 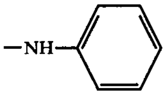 | " | " |
| 4 | " | " | —$NHC_{14}H_{29}$(sec) | " | " |
| 5 | " | " | 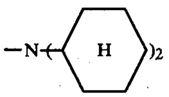 | " | 609 |
| 6 | " | —S— | —$N(C_2H_4OC_2H_4OCH_3)_2$ | " | 611 |
| 7 | —CN | " | 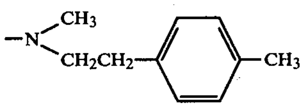 | Greenish blue | 630 |
| 8 | " | —O— | —$N(C_9H_{19}(n))_2$ | " | " |

TABLE 4-continued
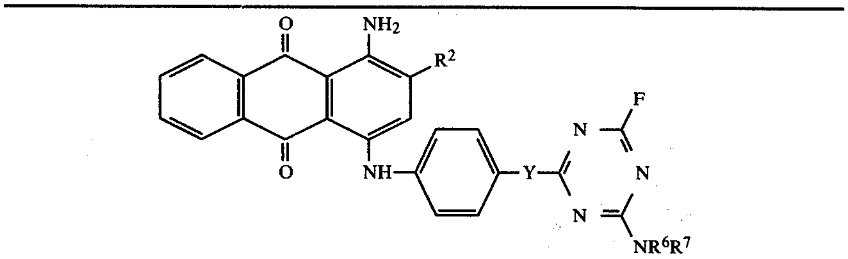
| No. | —$R^2$ | —Y— | —$NR^6R^7$ | Hue of the Dyed Materials | λ max (acetone) (nm) |
|---|---|---|---|---|---|
| 9 | " | " | —$NH_2$ | " | " |
| 10 | —$SO_2CH_3$ | " | 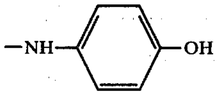 | " | 620 |
| 11 | " | " | —$N(CH_2—CH=CH_2)_2$ | " | 619 |
| 12 | " | —S— | —$NHC_2H_5$ | " | 621 |
| 13 | —$SO_2C_2H_5$ | —O— | 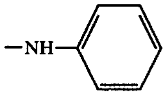 | " | 620 |
| 14 | 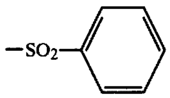 | " | —$N(C_6H_{13}(n))_2$ | " | 625 |
| 15 | " | " | 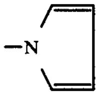 | " | 624 |
TABLE 5
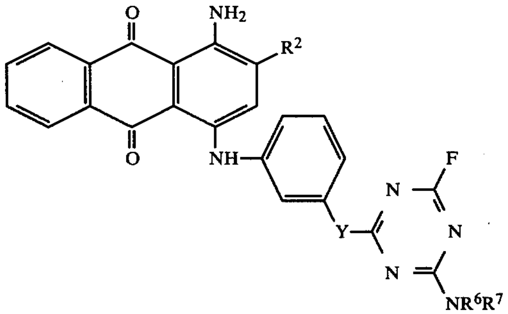
| No. | —$R^2$ | —Y— | —$NR^6R^7$ | Hue of the Dyed Materials | λ max (acetone) (nm) |
|---|---|---|---|---|---|
| 16 | —Cl | —O— | —$N(C_4H_9(n))_2$ | Blue | 609 |
| 17 | —Br | " | —$N(C_4H_9(i))_2$ | " | 610 |
| 18 | " | " | 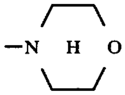 | " | " |
| 19 | " | " | 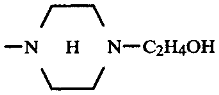 | " | " |

TABLE 5-continued
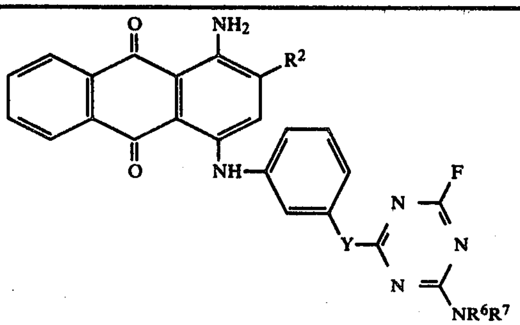
| No. | —$R^2$ | —Y— | —$NR^6R^7$ | Hue of the Dyed Materials | λ max (acetone) (nm) |
|---|---|---|---|---|---|
| 20 | " | —S— | —$NHC_2H_4CN$ | " | 611 |
| 21 | —CN | —O— | —$NH(CH_2)_8CH{=}CH{-}(CH_2)_7CH_3$ | Greenish blue | 630 |
| 22 | " | —S— | —$N(C_3H_7(i))_2$ | " | 632 |
| 23 | —$SO_2CH_3$ | —O— | 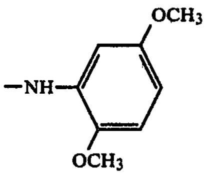 | " | 620 |
| 24 | " | " | —$N(C_3H_6OCH_3)_2$ | " | 619 |
| 25 | 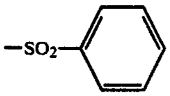 | " | 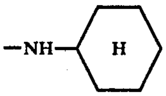 | " | 625 |
| 26 | " | —S— | —$N(C_2H_5)_2$ | " | 626 |
TABLE 6
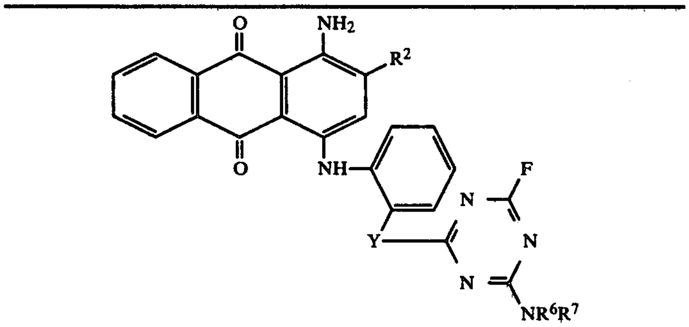
| No. | —$R^2$ | —Y— | —$NR^6R^7$ | Hue of the Dyed Materials | λ max (acetone) (nm) |
|---|---|---|---|---|---|
| 27 | —Br | —O— | —$N(C_3H_7(i))_2$ | Blue | 610 |
| 28 | " | " | —$NHC_6H_{13}(n)$ | " | " |
| 29 | " | " | 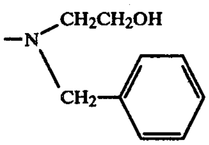 | " | " |
| 30 | " | —S— | —$N(C_4H_9(n))_2$ | " | 611 |
| 31 | —CN | —O— | 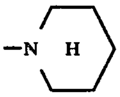 | Greenish blue | 630 |

TABLE 6-continued

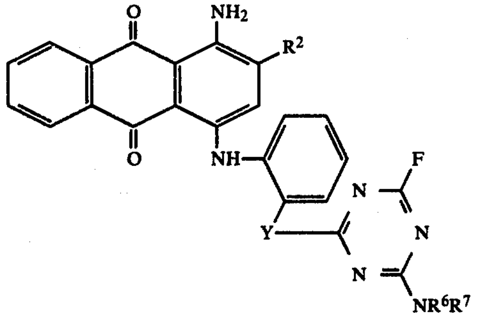

| No. | $-R^2$ | $-Y-$ | $-NR^6R^7$ | Hue of the Dyed Materials | λ max (acetone) (nm) |
|---|---|---|---|---|---|
| 32 | " | " | 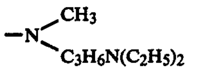 | " | " |
| 33 | $-SO_2C_2H_5$ | " | $-NHC_{14}H_{29}$ | " | 621 |
| 34 | " | $-S-$ | $-N(C_2H_5)_2$ | " | 622 |

EXAMPLE 11

A dye dispersion was made from a mixture of an anthraquinone dye of the formula indicated below (15 parts), a naphthalenesulfonic acid-formaldehyde condensate (15 parts) and water (70 parts) by shaking it with a paint shaker.

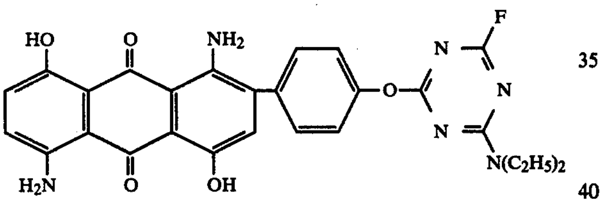

Using the dye dispersion, color paste for printing having the formulation indicated below was prepared.

| | parts |
|---|---|
| Dye dispersion | 6.5 |
| 5% Aqueous solution of sodium alginate | 55 |
| Polyethylene glycol dimethyl ether (average molecular weight: 400) | 9 |
| Water | 29.5 |
| | 100.0 (pH 8.0) |

A polyester/cotton (65:35) blend cloth was printed with the paste by a screen printing machine, subjected to intermediate drying at 80° C. for 3 minutes, and set by dry heating at 215° C. for 90 seconds. After washing with water, the heat set cloth was soaped with a cleaning solution containing 2 g of Scorerol #900 per liter in a liquor ratio of 30:1 at 80° C. for 20 minutes to provide a blue dyed material having excellent color fastness to light and wet color fastness.

The anthraquinone dye used in this example was prepared by the following method. To a solution of 1,5-diamino-4,8-dihydroxy-2-(4-hydroxyphenyl)anthraquinone (3.62 g) in N-methyl-2-pyrrolidone (50 ml), triethylamine (2.0 g) and 2,4-difluoro-6-diethylaminotriazine (2.0 g) were added, and the mixture was subjected to condensation under stirring at 40° C. for 3 hours. The resulting reaction liquor was added dropwise to water (500 ml), and the resulting precipitate was filtered out, washed with water and dried in a vacuum dryer at room temperature to provide a dark blue powder (4.9 g) of the dye of the formula indicated above. The dye had a λ max (acetone) of 628 nm.

EXAMPLE 12

A dye dispersion was made from a mixture of an anthraquinone dye of the formula indicated below (15 parts), Pluronic ®L64 (10 parts) and water (75 parts) by grinding it with a sand grinder.

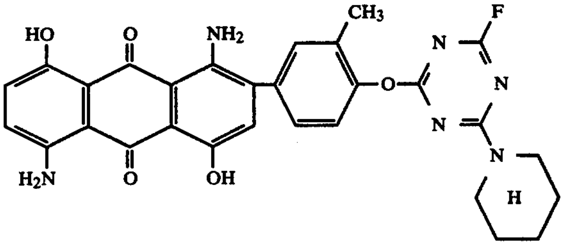

Using the dye dispersion, color paste for printing having the formulation indicated below was prepared.

| | parts |
|---|---|
| Dye dispersion | 7 |
| 5% Aqueous solution of sodium alginate | 55 |
| Diacetate of polypropylene glycol (average molecular weight: 300) | 10 |
| Polyethylene glycol diglycidyl ether (average molecular weight: 200) | 3 |
| Water | 25 |
| | 100 (pH 6.5) |

A mercerized cotton broadcloth (count of yarn No. 40) was printed with the paste by a screen printing machine, subjected to intermediate drying at 80° C. for 3 minutes, and set by heating with superheated steam at 185° C. for 7 minutes, followed by washing as in Example 11. A blue dyed material having high color fastness to light and wet color fastness was produced.

The anthraquinone dye used in this example was prepared by reacting 1,5-diamino-4,8-dihydroxy-2-(3-methyl-4-hydroxyphenyl)anthraquinone with 2,4-difluoro-6-piperazinyltriazine in dimethyl sulfoxide using tri-n-butylamine as an acid scavenger. The dye had a λ max of 629 nm.

EXAMPLE 13

Dye ink was made from a mixture of an anthraquinone dye of the formula indicated below (10 parts), polyoxyethylene glycol nonylphenyl ether with an HLB of 8.9 (2 parts) and diethylene glycol diacetate (88 parts) by milling it with a paint conditioner.

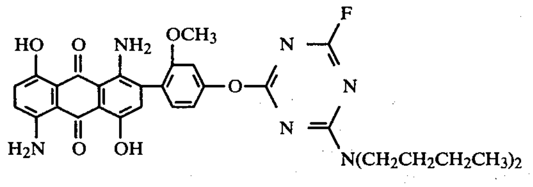

A mixture of 10 parts of the dye ink and 55 parts of mineral terpene was gradually added to 35 parts of an aqueous solution of the following composition under stirring with a homomixer at 5,000 to 7,000 rpm to form color paste in the form of a viscous O/W type emulsion.

| | parts |
|---|---|
| Water | 31 |
| Lepitol G | 3.8 |
| Sodium trichloroacetate | 0.1 |
| | 34.9 |

A polyester/cotton (65:35) blend cloth was printed with the paste by a screen printing machine, dried at 100° C. for 2 minutes and treated with superheated steam at 175° C. for 7 minutes. Subsequently, the cloth was washed with a heated tetrachloroethylene bath containing a small amount of water, and dried to provide a blue dyed material free from staining on white parts and having high color fastness to light and wet color fastness.

The anthraquinone dye used in this example was prepared by reacting 1,5-diamino-4,8-dihydroxy-2-(2-methoxy-4-hydroxyphenyl)anthraquinone with 2,4-difluoro-6-(N,N-di-n-butylamino)triazine at 60° C. for 2 hours in methyl ethyl ketone using triethylamine and potassium carbonate as acid scavengers. The dye had a λ max (acetone) of 628 nm.

EXAMPLE 14

A dye dispersion was made from a mixture of an anthraquinone dye (16 parts) of the formula indicated below, polyoxyethylene glycol nonylphenyl ether with an HLB of 13.3 (7 parts), naphthalenesulphonic acid-formaldehyde condensate (3 parts) and water (7 parts) by grinding it with a stand grinder.

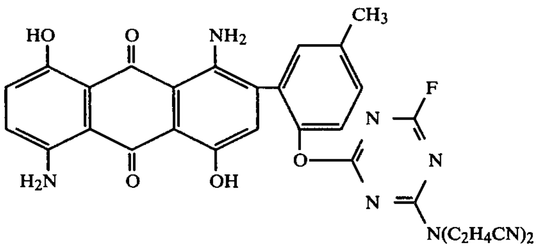

Using this dye dispersion, a padding bath of the formulation indicated below was prepared.

| | parts |
|---|---|
| Dye dispersion | 6 |
| Tetraethylene glycol dimethyl ether | 15 |
| Water | 79 |
| | 100 |
| | (pH 8.0) |

The padding batch was impregnated in a polyester/cotton (65:35) blend cloth, squeezed at a ratio of 45%, dried at 100° C. for 2 minutes and set by dry heating at 200° C. for 1 minute. By washing the heat set cloth with a heated ethanol bath, a blue dyed material having high color fastness to light and wet color fastness was produced. The dye used in thie example was prepared as in Example 11, and it had a λ max (acetone) of 627 nm.

EXAMPLE 15

A nylon/rayon (50/50) blend cloth was printed as in Example 11 except that the heat setting temperature was changed to 185° C. A blue dyed material having excellent color fastness to light and wet color fastness was obtained.

EXAMPLE 16

The anthraquinone dyes listed in Tables 7 to 9 were prepared as in Example 11 and they were used to print pieces of polyester/cotton (65:35) blend cloth as in Example 11. All of the dyed materials had excellent color fastness to light and wet color fastness. The hue of the dyed materials and the λ max (acetone) data for the dyes are also indicated in Tables 7 to 9.

TABLE 7
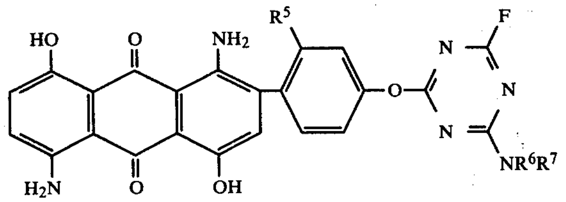
| No. | $-R^5$ | $-NR^6R^7$ | Hue of the Dyed Materials | λ max (acetone) (nm) |
|---|---|---|---|---|
| 1 | —H | $-NHC_3H_7(i)$ | Blue | 628 |
| 2 | " | $-NH_2$ | " | 627 |
| 3 | " | $-N[C_3H_7(i)]_2$ | " | 628 |
| 4 | " | $-N[C_4H_9(sec)]_2$ | " | " |
| 5 | " | 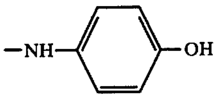 | " | " |
| 6 | " | 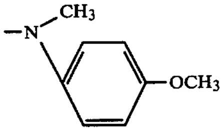 | " | " |
| 7 | " | 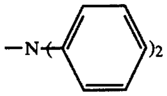 | " | " |
| 8 | " | 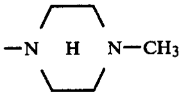 | " | " |
| 9 | " | $-N[CH_2CH_2N(CH_3)_2]_2$ | " | " |
| 10 | " | $-N(CH_2-CH=CH_2)_2$ | " | " |
| 11 | " | $-NHCH_2\underset{\displaystyle OH}{\underset{\vert}{C}}HCH_3$ | " | " |
| 12 | " | $-NHC_{18}H_{37}(n)$ | " | " |
| 13 | " | $-N(CH_2CH_2CH_2OH)_2$ | " | " |
| 14 | " | $-N[C_6H_{13}(n)]_2$ | " | " |
| 15 | " | 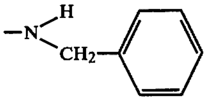 | " | " |
| 16 | " | 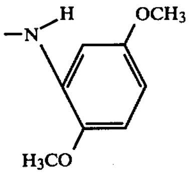 | " | " |
| 17 | " | $-N[C_6H_{13}(i)]_2$ | " | " |
| 18 | " | 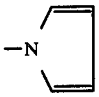 | " | " |
| 19 | " | $-N\begin{matrix} C_3H_6OH \\ C_3H_6CN \end{matrix}$ | " | " |

TABLE 7-continued
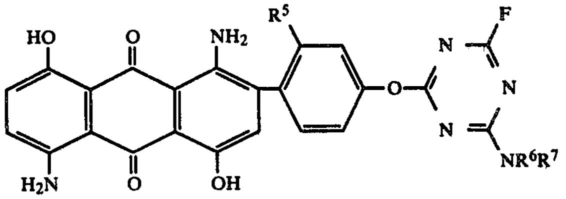
| No. | —$R^5$ | —$NR^6R^7$ | Hue of the Dyed Materials | λ max (acetone) (nm) |
|---|---|---|---|---|
| 20 | " | 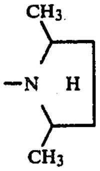 | " | " |
| 21 | " | —$N[C_5H_{11}(sec)]_2$ | " | " |
| 22 | " | —$N(C_2H_4OCH_3)_2$ | " | " |
| 23 | " | 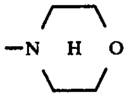 | " | " |
| 24 | " | —$NHC_5H_{11}(i)$ | " | " |
| 25 | " | 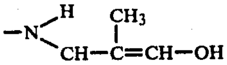 | " | " |
| 26 | " | 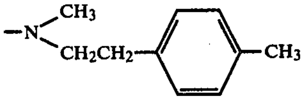 | " | " |
| 27 | " | 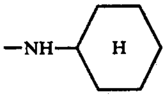 | " | " |
| 28 | —$CH_3$ | —$N[C_4H_9(n)]_2$ | " | " |
| 29 | " | —$N(CH_2CH_2OCH_3)_2$ | " | " |
| 30 | " | 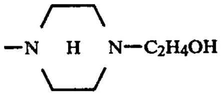 | " | " |
| 31 | " | —$N(CH_3)_2$ | " | " |
| 32 | " | 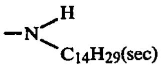 | " | " |
| 33 | —$OC_2H_5$ | —$N[C_9H_{19}(n)]_2$ | " | " |
| 34 | " | 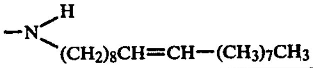 | " | " |

TABLE 8
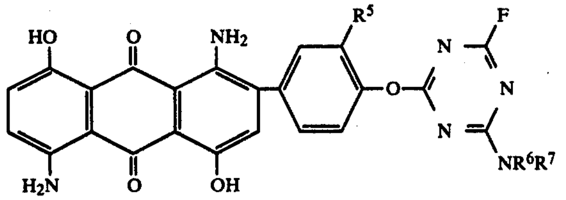
| No. | $-R^5$ | $-NR^6R^7$ | Hue of the Dyed Materials | λ max (acetone) (nm) |
|---|---|---|---|---|
| 35 | $-CH_3$ | $-N(C_2H_4OH)_2$ | Blue | 629 |
| 36 | $-CH_3$ | 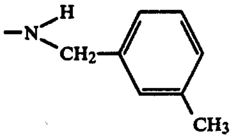 | " | " |
| 37 | $-CH_3$ | 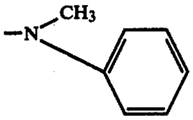 | " | " |
| 38 | $-CH_3$ | 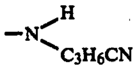 | " | " |
| 39 | $-CH_3$ | $-N(C_3H_6OCH_3)_2$ | " | " |
| 40 | $-CH_3$ | 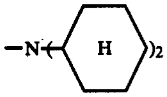 | " | " |
| 41 | $-C_3H_7(n)$ | $-NH_2$ | " | " |
| 42 | $-C_3H_7(n)$ | $-N(C_2H_4OC_2H_4OCH_3)_2$ | " | " |
| 43 | $-C_3H_7(n)$ | 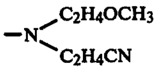 | " | " |
| 44 | $-OC_3H_6(i)$ | $-N(CH_3)_2$ | " | 628 |
| 45 | $-OC_3H_6(i)$ | 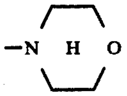 | " | " |
| 46 | $-OC_3H_6(i)$ | 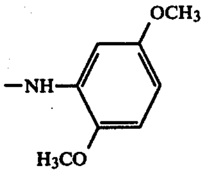 | " | " |
| 47 | $-CH_3$ | $-N[C_3H_7(i)]_2$ | " | 629 |
| 48 | $-CH_3$ | $-N[C_6H_{13}(n)]_2$ | " | " |

TABLE 9

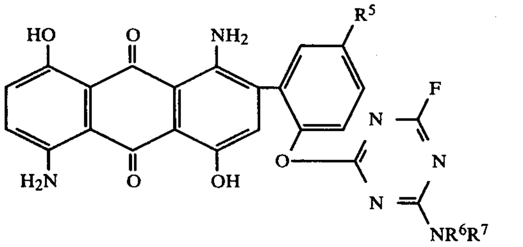

| No. | —$R^5$ | —$NR^6R^7$ | Hue of the Dyed Materials | λ max (acetone) (nm) |
|---|---|---|---|---|
| 49 | —$CH_3$ | —$N(CH_3)_2$ | Blue | 627 |
| 50 | —$CH_3$ | —$N[C_3H_7(n)]_2$ | " | " |
| 51 | —$CH_3$ | 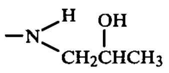 | " | " |
| 52 | —$CH_3$ | —$N[C_3H_7(i)]_2$ | " | " |
| 53 | —$CH_3$ | —$NH_2$ | " | 626 |
| 54 | —$CH_3$ | 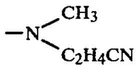 | " | 627 |
| 55 | —$CH_3$ | 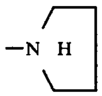 | " | " |
| 56 | —$CH_3$ | —$N[C_6H_{13}(n)]_2$ | " | " |
| 57 | —$OC_2H_5$ | —$N(C_2H_5)_2$ | " | 628 |
| 58 | —$OC_2H_5$ | —$N[C_4H_9(n)]_2$ | | " |

EXAMPLE 17

A dye dispersion was made from a mixture of an anthraquinone dye of the formulation indicated below (15 parts), a naphthalenesulfonic acid-formaldehyde condensate (15 parts) and water (70 parts) by shaking it with a paint shaker.

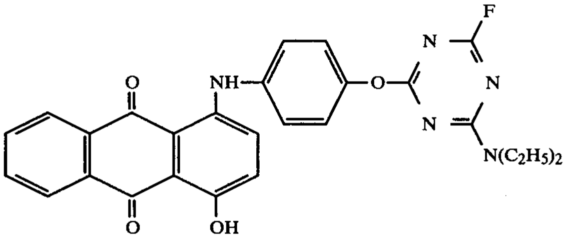

Using this dye dispersion, color paste for printing having the formulation indicated below was prepared.

| | parts |
|---|---|
| Dye dispersion | 6.5 |
| 5% Aqueous solution of sodium alginate | 55.0 |
| Polyethylene glycol dimethyl ether (average molecular weight: 400) | 9.0 |
| Water | 29.5 |
| | 100.0 (pH 8.0) |

A polyester/cotton (63:35) blend cloth was printed with the paste by a screen printing machine, subjected to intermediate drying at 80° C. for 3 minutes, and set by dry heating at 215° C. for 90 seconds. The heat set cloth was washed with water, and then soaped with a cleaning solution containing 2 g of Scorerol #900 per liter in a liquor ratio of 30:1 at 80° C. for 20 minutes to thereby provide a purple dyed material free from staining on white parts and having excellent color fastness to light and wet color fastness.

The anthraquinone dye used in this example was prepared by the following method. To acetate (100 ml), 1-(4-hydroxyanilino)-4-hydroxyanthraquinone (3.15 g), 2,4-difluoro-6-diethylaminotriazine (1.9 g), triethylamine (1.1 g) and anhydrous potassium carbonate (1.4 g) were added, and the mixture was subjected to condensation by heating under reflux for 1.5 hours. The reaction liquor obtained was added dropwise to water (1,000 ml) and the resulting precipitate was filtered out, washed with water and dried in a vacuum dryer to provide 4.5 g of a dark red dye powder (yield: 93%). The dye had a λ max (acetone) of 557 nm.

EXAMPLE 18

A dye dispersion was made from a mixture of an anthraquinone (15 parts) of the formula indicated below, Pluronic ®L64 (10 parts) and water (10 parts) by grinding it with a sand grinder.

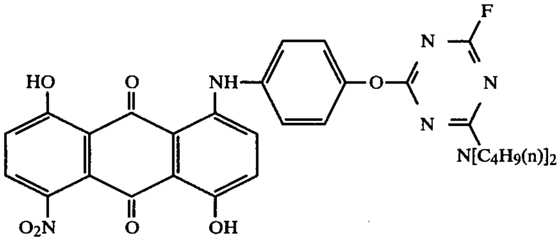

Using this dye dispersion, color paste for printing having the formulation indicated below was prepared.

| | parts |
|---|---|
| Dye dispersion | 9 |
| 5% Aqueous solution of sodium alginate | 55 |
| Diacetate of polypropylene glycol (average molecular weight: 300) | 10 |
| Polyethylene glycol diglycidyl ether (average molecular weight: 200) | 3 |
| Water | 25 |
| | 100 (pH 6.5) |

A mercerized cotton broadcloth (count of yarn No. 40) was printed with the paste by a screen printing machine, subjected to intermediate drying at 80° C. for 3 minutes and treated with superheated steam at 185° C. for 7 minutes. By washing the heat set cloth as in Example 17, a blue dyed material having excellent color fastness to light and wet color fastness was produced.

The anthraquinone dye used in this example was prepared by reacting 1-(4-hydroxyanilino)-4,8-dihydroxy-5-nitroanthraquinone with 2,4-difluoro-6-di-(n-butylamino)triazine at 50° C. in N-methyl-2-pyrrolidone using triethylamine as an acid scavenger. The dye had a λ max (acetone) of 582 nm.

EXAMPLE 19

Dye ink was made from a mixture of an anthraquinone dye (10 parts) of the formula indicated below, polyoxyethylene glycol nonylphenyl ether with an HLB of 8.9 (2 parts) and diethylene glycol diacetate (88 parts) by milling it with a paint conditioner.

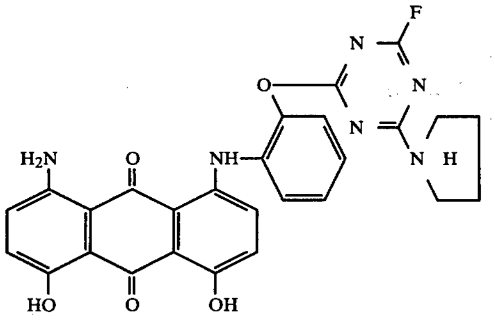

A mixture of the dye ink (10 parts) and mineral terpene (55 parts) was gradually added to 35 parts of an aqueous solution of the following composition under agitation with a homomixer at 5,000 to 7,000 rpm to form color paste in the form of a viscous O/W type emulsion.

| | parts |
|---|---|
| Water | 31 |
| Lepitol G | 3.8 |
| Sodium trichloroacetate | 0.1 |
| | 34.9 |

A polyester/cotton (65:35) blend cloth was printed with the paste by a screen printing machine, dried at 100° C. for 2 minutes and treated with superheated steam at 175° C. for 7 minutes. Subsequently, the cloth was washed with a heated tetrachloroethylene bath containing a small amount of water, and dried to form a blue dyed material free from staining on white parts and having excellent color fastness to light and wet color fastness.

The anthraquinone dye used in this example was prepared by reacting 1-(2-hydroxyanilino)-4,5-dihydroxy-8-aminoanthraquinone with 2,4-difluoro-6-(1-pyrrolidinyl)triazine at 70° C. for 1 hour in dioxane using triethylamine as an acid scavenger. The dye had a λ max (acetone) of 607 nm.

EXAMPLE 20

A dye dispersion was made from a mixture of an anthraquinone dye of the formula indicated below (16 parts), polyoxyethylene glycol nonylphenyl ether with an HLB of 13.3 (7 parts), a naphthalenesulfonic acid-formaldehyde condensate (3 parts) and water (74 parts) by grinding it with a sand grinder.

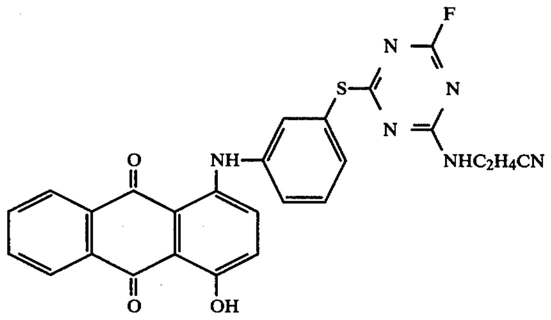

Using this dye dispersion, a padding having the formulation indicated below was prepared.

| | parts |
|---|---|
| Dye dispersion | 6 |
| Tetraethylene glycol dimethyl ether | 15 |
| Water | 79 |
| | 100 |
| | (pH 8.0) |

The bath was impregnated in a polyester/cotton (65:35) blend cloth, squeezed at a ratio of 45%, dried at 100° C. for 2 minutes and set by dry heating at 200° C. for 1 minute. The heat set cloth was washed with a heated ethanol bath to provide a purple dyed material having excellent color fastness to light and wet color fastness.

The anthraquinone dye used in this example was prepared by reacting 1-(3-mercaptoanilino)-4-hydroxyanthraquinone with 2,4-difluoro-6-($\beta$-cyanoethyl-)aminotriazine in tetrahydrofuran using triethylamine as an acid scavenger. The dye had a λ max (acetone) of 554 nm.

EXAMPLE 21

A nylon/rayon (50/50) was printed as in Example 17 except that the heat setting temperature was changed to 185° C. A purple dyed material having excellent color fastness to light and wet color fastness was obtained.

EXAMPLE 22

The anthraquinone dyes listed in Tables 10 to 12 were prepared as in Example 17 and they were used to print pieces of polyester/cotton (65:35) blend cloth as in Example 17. All of the dyed materials had excellent color fastness to light and wet color fastness. The hue of the dyed materials and the λ max (acetone) data for the dyes are also indicated in Tables 10 to 12.

TABLE 10
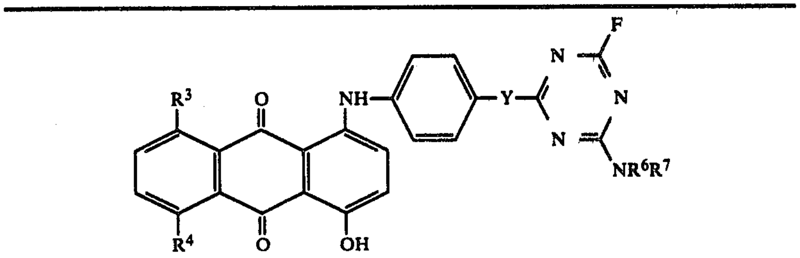
| No. | —R³ | —R⁴ | —Y— | —NR⁶R⁷ | Hue of the Dyed Materials | λ max (acetone) (nm) |
|---|---|---|---|---|---|---|
| 1 | —H | —H | —O— | 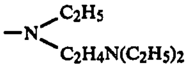 | Purple | 557 |
| 2 | —H | —H | —O— | $-N[C_4H_9(i)]_2$ | " | " |
| 3 | —H | —H | —O— | $-N(CH_3)_2$ | " | " |
| 4 | —H | —H | —O— |  | " | " |
| 5 | —H | —H | —O— | 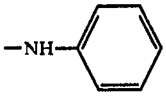 | " | " |
| 6 | —H | —H | —O— | 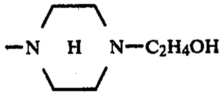 | " | " |
| 7 | —H | —H | —O— | $-NHC_{14}H_{29}$(sec) | " | " |
| 8 | —H | —H | —O— | $-NHC_2H_4CN$ | " | " |
| 9 | —H | —H | —O— | 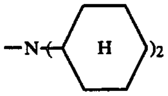 | " | " |
| 10 | —H | —H | —O— | $-NH(CH_2)_8CH=CH-(CH_2)_7CH_3$ | " | " |
| 11 | —H | —H | —O— | $-N(C_2H_4OC_2H_4OCH_3)_2$ | " | " |
| 12 | —H | —H | —O— | $-N[C_3H_7(i)]_2$ | " | " |
| 13 | —H | —H | —S— | 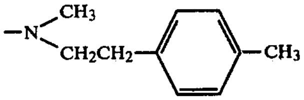 | " | 554 |
| 14 | —H | —H | —S— | 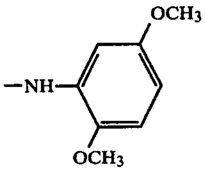 | " | " |
| 15 | —H | —H | —S— | $-N[C_9H_{19}(n)]_2$ | " | " |
| 16 | $-NO_2$ | —OH | —O— | $-N(C_3H_6OCH_3)_2$ | Blue | 580 |
| 17 | $-NO_2$ | —OH | —O— | $-NH_2$ | " | " |
| 18 | $-NO_2$ | —OH | —O— | $-N[C_3H_7(i)]_2$ | " | " |
| 19 | $-NO_2$ | —OH | —S— | 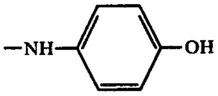 | " | 581 |

TABLE 10-continued
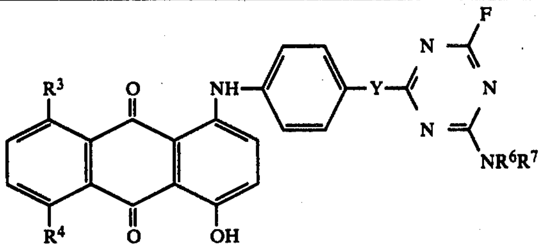
| No. | —R³ | —R⁴ | —Y— | —NR⁶R⁷ | Hue of the Dyed Materials | λ max (acetone) (nm) |
|---|---|---|---|---|---|---|
| 20 | $-NO_2$ | —OH | —S— | 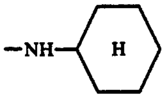 | " | " |
| 21 | —OH | $-NO_2$ | —O— | $-NHC_2H_5$ | " | 583 |
| 22 | —OH | $-NO_2$ | —O— | $-N(C_2H_5)_2$ | " | " |
| 23 | —OH | $-NO_2$ | —O— | $-N(CH_2-CH{=}CH_2)_2$ | " | " |
| 24 | $-NH_2$ | —OH | —O— | 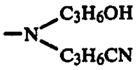 | " | 607 |
| 25 | $-NH_2$ | —OH | —O— | 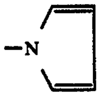 | " | " |
| 26 | $-NH_2$ | —OH | —O— | 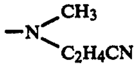 | " | " |
| 27 | —OH | $-NH_2$ | —O— | $-N[C_6H_{13}(n)]_2$ | " | 609 |
| 28 | —OH | $-NH_2$ | —O— | $-N(CH_2CH_2CH_2OH)_2$ | " | " |
| 29 | —OH | $-NH_2$ | —S— | 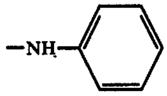 | " | 610 |
TABLE 11
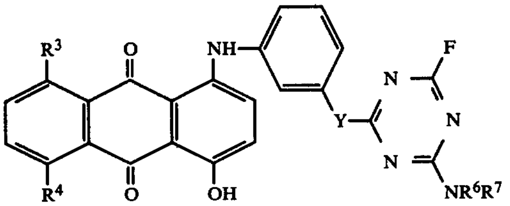
| No. | —R³ | —R⁴ | —Y— | —NR⁶R⁷ | Hue of the Dyed Materials | λ max (acetone) (nm) |
|---|---|---|---|---|---|---|
| 30 | —H | —H | —O— | $-N[C_4H_9(i)]_2$ | Purple | 557 |
| 31 | " | " | " | $-N[CH_2CH_2N(CH_3)_2]_2$ | " | " |
| 32 | " | " | " | 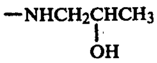 | " | " |
| 33 | " | " | " | 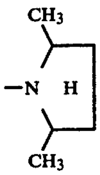 | " | " |

TABLE 11-continued
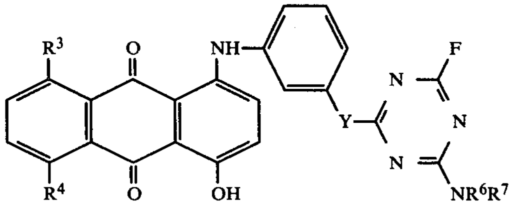
| No. | $-R^3$ | $-R^4$ | —Y— | $-NR^6R^7$ | Hue of the Dyed Materials | λ max (acetone) (nm) |
|---|---|---|---|---|---|---|
| 34 | " | " | " | 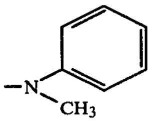 | " | " |
| 35 | " | " | —S— | $-NHC_{18}H_{37}(n)$ | " | 554 |
| 36 | " | " | " | 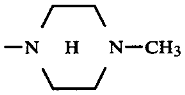 | " | " |
| 37 | $-NO_2$ | —OH | —O— | 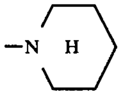 | Blue | 580 |
| 38 | " | " | " | $-N[C_3H_7(i)]_2$ | " | " |
| 39 | " | " | —S— | 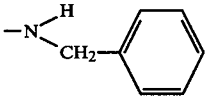 | " | 581 |
| 40 | —OH | $-NO_2$ | —O— | $-N[C_4H_9(n)]_2$ | " | 583 |
| 41 | " | " | " | $-N(CH_2CH_2CN)_2$ | " | " |
| 42 | " | " | —S— | 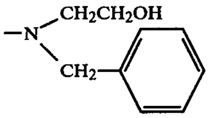 | " | 584 |
| 43 | $-NH_2$ | —OH | —O— | 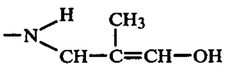 | " | 607 |
| 44 | " | " | " | $-NHC_6H_{13}(n)$ | " | " |
| 45 | —OH | $-NH_2$ | —S— | $-NH_2$ | " | 609 |
| 46 | $-NO_2$ | —H | —O— | $-N[C_3H_7(i)]_2$ | Reddish blue | 568 |
| 47 | " | " | " | 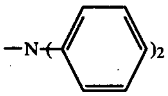 | " | " |

TABLE 12

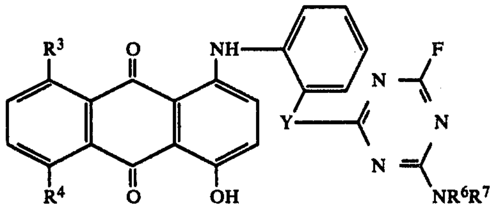

| No. | —$R^3$ | —$R^4$ | —Y— | —$NR^6R^7$ | Hue of the Dyed Materials | λ max (acetone) (nm) |
|---|---|---|---|---|---|---|
| 48 | —H | —H | —O— | —$N(C_2H_5)_2$ | Purple | 557 |
| 49 | " | " | " | —$N[C_4H_9(n)]_2$ | " | " |
| 50 | " | " | " | —$NHC_{14}H_{29}(i)$ | " | " |
| 51 | " | " | —S— | —$NHC_2H_4OC_2H_4OC_2H_5$ | " | 554 |
| 52 | —$NO_2$ | —OH | —O— | —$N[C_5H_{11}(n)]_2$ | Blue | 580 |
| 53 | " | " | " | —$N[C_3H_7(n)]_2$ | " | " |
| 54 | —OH | —$NO_2$ | " | —N($CH_3$)($C_3H_6N[C_4H_9(n)]_2$) | " | 583 |
| 55 | " | " | " | —$NHC_3H_7(i)$ | " | " |
| 56 | " | " | —S— | —$NHC_2H_4OH$ | " | 584 |
| 57 | —$NH_2$ | —OH | —O— | —$N[C_4H_9(n)]_2$ | " | 607 |
| 58 | " | " | " | —$NHC_2H_4$— 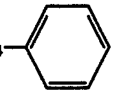 | " | " |
| 59 | " | " | " | —N($CH_2$— 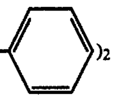 $)_2$ | " | " |
| 60 | " | " | —S— | —$N[C_3H_7(i)]_2$ | " | 609 |

EXAMPLE 23

A dye dispersion was made from a mixture of an anthraquinone dye of the formulation indicated below (15 parts), a naphthalenesulfonic acid-formaldehyde condensate (15 parts) and water (70 parts) by shaking it with a paint shaker.

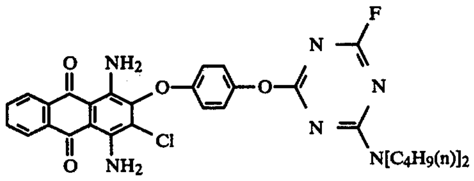

Using the dye dispersion, color paste for printing having the formulation indicated below was prepared.

| | parts |
|---|---|
| Dye dispersion | 6.5 |
| 5% Aqueous solution of sodium alginate | 55.0 |
| Polyethylene glycol dimethyl ether (average molecular weight: 400) | 9.0 |
| Water | 29.5 |
| | 100.0 (pH 8.0) |

A polyester/cotton (65:35) blend cloth was printed with the paste by a screen printing machine, subjected to intermediate drying at 80° C. for 3 minutes and set by dry heating at 215° C. for 90 seconds. After washing with water, the cloth was soaped with a cleaning solution containing 2 g of Scorerol #900 per liter at 80° C. for 20 minutes in a liquor ratio of 30:1, to thereby produce a purple dyed material having excellent color fastness to light and wet color fastness.

The dye used in this example was prepared by the following method. To acetone (100 ml), 1,4-diamino-2-(4-hydroxyphenoxy)-3-chloroanthraquinone (3.8 g), 2,4-difluoro-6-di-(n-butylamino)triazine (2.6 g), triethylamine (1.0 g) and anhydrous potassium carbonate (1.4 g) were added, and the mixture was subjected to condensation by heating under reflux for 2 hours. The reaction liquor obtained was added dropwise to water (1,000 ml), and the resulting precipitate was filtered out, washed with water and dried in a vacuum dryer at room temperature to form 5.7 g (yield: 95%) of a reddish blue powder of the dye having the formula indicated above. The dye had a λ max (acetone) of 551 nm.

EXAMPLE 24

A nylon/rayon (50:50) blend cloth was printed as in Example 23 except that the heat setting temperature was changed to 185° C. A reddish blue dyed material having excellent color fastness to light and wet color fastness was obtained.

EXAMPLE 25

The anthraquinone dyes listed in Tables 13 to 15 were used to print pieces of polyester/cotton (65:35) blend cloth as in Example 23. All of the dyed materials had excellent color fastness to light and wet color fastness. The hue of the dyed materials and the λ max (acetone) data for the dyes are also listed in Tables 13 to 15.

TABLE 13

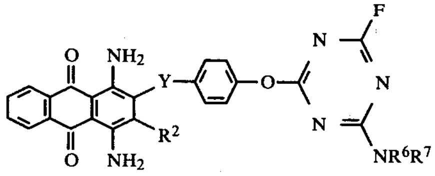

| No. | —Y— | —$R^2$ | —$NR^6R^7$ | Hue of the Dyed Materials | λ max (acetone) (nm) |
|---|---|---|---|---|---|
| 1 | —O— | —H— | 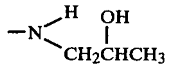 | Red purple | 544 |
| 2 | " | " | —$N[C_3H_7(i)]_2$ | Red purple | " |
| 3 | " | " | —$N[C_6H_{13}(n)]_2$ | Red purple | 545 |
| 4 | " | —Cl | —$NHC_8H_{17}(n)$ | Purple | 551 |
| 5 | " | " | —$N[C_4H_9(i)]_2$ | " | " |
| 6 | " | " | —$N[C_9H_{19}(n)]_2$ | " | " |
| 7 | " | —Br | 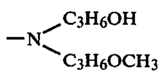 | " | 550 |
| 8 | —S— | —H | 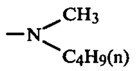 | " | 549 |

TABLE 14

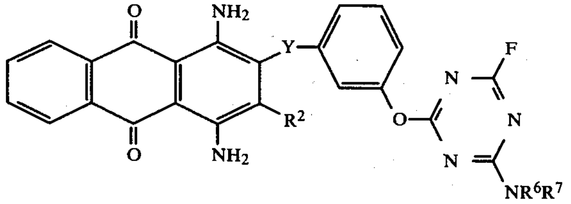

| No. | —Y— | —$R^2$ | —$NR^6R^7$ | Hue of the Dyed Materials | λ max (acetone) (nm) |
|---|---|---|---|---|---|
| 9 | —O— | —H | —$N[C_4H_9(i)]_2$ | Red Purple | 544 |
| 10 | " | —Cl | 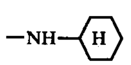 | Purple | 550 |
| 11 | " | " | —$N(CH_2CH{=}CH_2)_2$ | " | 551 |
| 12 | " | " | —$N[C_4H_9(n)]_2$ | " | " |
| 13 | " | " | —$N[C_3H_7(n)]_2$ | " | " |
| 14 | —S— | —H | 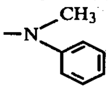 | " | 549 |

TABLE 15

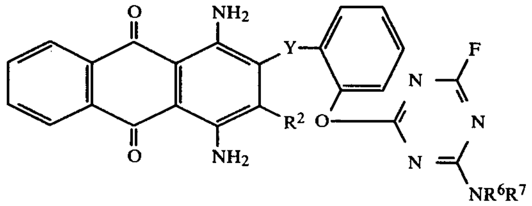

| No. | —Y— | —$R^2$ | —$NR^6R^7$ | Hue of the Dyed Materials | λ max (acetone) (nm) |
|---|---|---|---|---|---|
| 15 | —O— | —Cl | 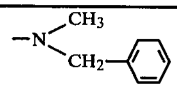 | Purple | 551 |
| 16 | " | —Br | —$N[C_7H_{15}(n)]_2$ | " | 550 |
| 17 | " | " | 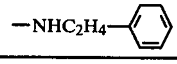 | " | " |

While the invention has been described in detail and with reference to specific embodiments thereof, it will be apparent to one skilled in the art that various changes and modifications can be made therein without departing from the spirit and scope thereof.

What is claimed is:

1. An anthraquinone dye for cellulose-containing fibers having the formula (I):

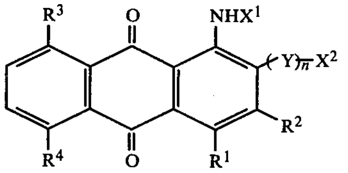

(I)

wherein $R^1$ is —$NH_2$ or a hydroxyl group; $R^2$ is a hydrogen atom, a chlorine atom, a bromine atom, a cyano group or —$SO_2R$ (wherein R is a lower alkyl group or a phenyl group); $R^3$ and $R^4$ are each a hydrogen atom, —$NH_2$, a hydroxyl group, a nitro group, a chlorine atom or a bromine atom; Y is either —O— or —S—; one of $X^1$ and $X^2$ is a hydrogen atom and the other is

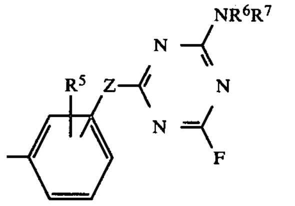

(wherein Z is either —O— or —S—; $R^5$ is a lower alkyl group, a lower alkoxy group or a hydrogen atom; $R^6$ and $R^7$ are each a hydrogen atom or an alkyl group, an alkenyl group, a cyclohexyl group, an aryl group or an aralkyl group which may be substituted by a cyano group, a hydroxyl group, a lower alkoxy group or a dialkylamino group, or $NR^6R^7$ represents a 5- or 6-membered nitrogen-containing heterocyclic ring formed by the bonding of $R^6$ and $R^7$ such that when $R^6$ and $R^7$ are taken together to form a heterocyclic ring, the nitrogen of the heterocyclic ring to which $R^6$ or $R^7$ are bonded is the nitrogen N of $NR^6R^7$; the sum of the carbon atoms of $R^6$ and $R^7$ is not more than 18); and n is 0 or 1, but n is 0 when $X^2$ is a hydrogen atom.

2. An anthraquinone dye according to claim 1, wherein $R^2$ is a hydrogen atom, a chlorine atom, a bromine atom or a cyano group; $R^3$ and $R^4$ are each a hydrogen atom, —$NH_2$ or a hydroxyl group; Y is —O—; Z is —O—; and $R^5$ is a hydrogen atom.

* * * * *